(12) United States Patent
Bhatt

(10) Patent No.: US 9,781,300 B1
(45) Date of Patent: Oct. 3, 2017

(54) METHOD AND SYSTEM FOR REMOVING OBJECTS FROM A PRINT DOCUMENT

(71) Applicant: KYOCERA Document Solutions Inc., Osaka (JP)

(72) Inventor: Jayant Bhatt, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/068,962

(22) Filed: Mar. 14, 2016

(51) Int. Cl.
*H04N 1/38* (2006.01)
*H04N 1/00* (2006.01)
*H04N 1/23* (2006.01)

(52) U.S. Cl.
CPC ........... *H04N 1/38* (2013.01); *H04N 1/00204* (2013.01); *H04N 1/00411* (2013.01); *H04N 1/2338* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 2003/0231325 A1* | 12/2003 | Kubo | ...................... | H04N 1/40 358/1.9 |
| 2007/0229888 A1* | 10/2007 | Matsui | ................... | G06T 11/60 358/1.15 |
| 2008/0122864 A1* | 5/2008 | Utsunomiya et al. | .. | G06T 11/60 345/619 |
| 2011/0075220 A1 | 3/2011 | Chiba | | |

\* cited by examiner

*Primary Examiner* — Ngon Nguyen
(74) *Attorney, Agent, or Firm* — McDonnell Boehnen Hulbert & Berghoff LLP

(57) ABSTRACT

A method and system for removing objects from a print document are provided. An image forming apparatus receives a print document sent from a computing device remote from the image forming apparatus. The print document includes print data. The image forming apparatus further receives a directive to remove, from the print document, at least one type of object selected for removal, wherein the print data includes data representing one or more objects of the type of object selected for removal. In response to the directive, the image forming apparatus removes the one or more objects of the type of object selected for removal prior to printing the print document.

19 Claims, 14 Drawing Sheets

METHOD AND SYSTEM FOR REMOVING OBJECTS FROM A PRINT DOCUMENT

BACKGROUND

As printing devices mature, enhancing user experience becomes more important. For example, a user may want to customize a print document submitted from a computing device to a printing device by adding certain features to the document. This typically involves user interaction with either suitable software on the computing device or with the printing device itself. However, in certain situations, a user may want to remove certain features from the print document.

SUMMARY

A print document submitted for printing may contain various types of objects, and a user may desire to remove one or more types of objects (e.g., images) from the print document prior to printing that document. To illustrate, the user may want to discard one or more types of objects to (i) emphasize object enhancements made to the print document, (ii) save toner by not printing objects a user is not interested in, (iii) improve performance of a printing device by not rendering objects that are not needed, and/or (iv) achieve other goals.

The present disclosure provides ways to remove selected types of objects from a print document prior to printing.

More particularly, in one aspect, a method is disclosed. The method involves (i) receiving, at an image forming apparatus, a print document sent from a computing device remote from the image forming apparatus, wherein the print document includes print data, (ii) receiving, at the image forming apparatus, a directive to remove, from the print document, at least one type of object selected for removal, wherein the print data includes data representing one or more objects of the type of object selected for removal, and (iii) in response to the directive, removing, by the image forming apparatus, the one or more objects of the type of object selected for removal prior to printing the print document.

In one example, the directive comprises an object removal command in the print document. In another example, the directive comprises an environment value set via an operation panel of the image forming apparatus.

In yet another example, the directive includes a first directive provided via the image forming apparatus and a second directive provided via the computing device, and the method further comprises: (i) receiving, at the image forming apparatus, the first directive, (ii) receiving, at the image forming apparatus, the second directive, and (iii) selecting, by the image forming apparatus, the first directive rather than the second directive to remove the one or more objects of the type of object selected for removal.

In another aspect, a system is disclosed. The system comprises an image forming apparatus and a computing device remote from the image forming apparatus. The image forming apparatus is configured to (i) receive a print document sent from the computing device, wherein the print document includes print data, (ii) receive a directive to remove, from the print document, at least one type of object selected for removal, wherein the print data includes data representing one or more objects of the type of object selected for removal, and (iii) in response to the directive, remove the one or more objects of the type of object selected for removal prior to printing the print document.

In yet another aspect, another system is disclosed. The system comprises at least one processor, memory, and program instructions that are stored in the memory and, when executed by the at least one processor, cause the at least one processor to perform functions including: (i) receiving a print document sent from a computing device remote from the at least one processor, wherein the print document includes print data, (ii) receiving a directive to remove, from the print document, at least one type of object selected for removal, wherein the print data includes data representing one or more objects of the type of object selected for removal, and (iii) in response to the directive, removing the one or more objects of the type of object selected for removal prior to printing the print document.

These as well as other aspects, advantages, and alternatives will become apparent to those of ordinary skill in the art by reading the following detailed description with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. EXAMPLE SYSTEM ARRANGEMENT

Figure 1:
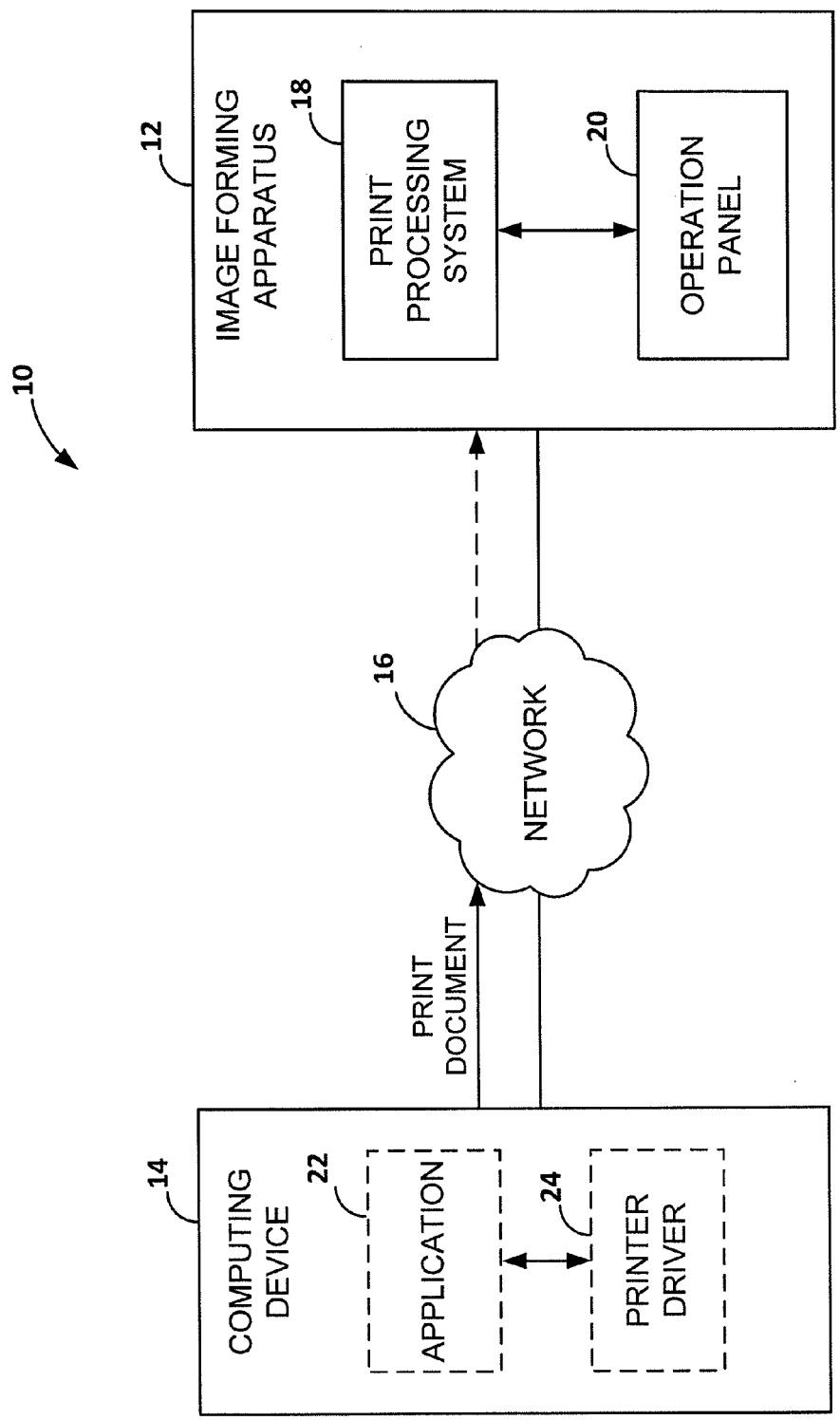
FIG. 1 illustrates one system arrangement, including an image forming apparatus and a computing device, in which an object removal embodiment may be carried out.

FIG. 1 illustrates one system arrangement 10 in which an object removal embodiment of the present disclosure may be employed. As shown in FIG. 1, the system arrangement 10 includes an image forming apparatus 12 and a computing device 14 that are coupled together via a network 16. As such, the computing device 14 and the image forming apparatus 12 may communicate with each other over the network 16. As further shown in FIG. 1, the image forming apparatus 12 includes a print processing system 18 and an operation panel 20. Additionally, the computing device 14 uses an application program (or "application," for short, as denoted in FIG. 1) 22 and a printer driver 24 that may reside on the computing device 14. Although FIG. 1 shows only one printer driver 24 for illustrative purposes, the computing device 14 may use multiple printer drivers associated, e.g., with different types of the image forming apparatus 12.

In general, the computing device 14 may be any suitable device configured (e.g., equipped with suitable software/hardware) to generate and send a print document to the image forming apparatus 12 for printing, as depicted in FIG. 1. Some examples of the computing device 14 include a personal computer, a mobile computer (e.g., a laptop or a tablet), and a handheld mobile device (e.g. a mobile/cellular phone (e.g., a smart phone) or a personal digital assistant (PDA). The computing device 14 may be equipped with suitable user interface(s) (e.g., a keypad, a keyboard, touch screen, mouse, a microphone, a display, etc.) to facilitate interaction with a user and the image forming apparatus 12.

In turn, the image forming apparatus 12 may be any suitable apparatus configured to print the print document sent from the computing device 14. Some examples of the image forming apparatus 12 include a dedicated printer or a multifunctional peripheral (MFP) device that typically performs functions of a printer, a copier, and a scanner.

In the image forming apparatus 12, the print processing system 18 (e.g., implemented in the form of processor(s) and program instructions stored in memory) is configured to process the print document received from the computing device 14 to produce a printed document. Further, the print processing system 18 may process inputs received via the operation panel 20.

Generally, the operation panel 20 allows an entity, such as a user, to provide inputs to configure (e.g., change or set) various operational settings of the image forming apparatus 12. For example, the operation panel 20 may be used to change default settings of the image forming apparatus 12 and to set optional settings to customize features for a print document to be printed. In this regard, the operation panel 20 may include a display device (e.g., a liquid crystal display ("LCD"), a touch screen, etc.) that can display current operational settings of the image forming apparatus 12, options to configure the operational settings, operational instructions, and/or the like. Further, the operation panel 20 may include an input device such as a keyboard, hard buttons, soft buttons, a touch screen, and/or the like, via which inputs to operate the image forming apparatus 12 may be provided. In some cases, the operation panel 20 may also include a dedicated controller configured to control functions of the operation panel 20.

The network 16 may be any type of a network suitable for carrying communications between the computing device 14 and the image forming apparatus 12, such as a wireless network, a landline network, or a combination of wireless and landline network(s). Additionally, the network 16 may be a private network (e.g., a wireless carrier's network, a landline and/or wireless local area network (LAN), wide area network (WAN), etc.) and/or a public network, such as the Internet. Although not shown, the network 16 will typically include any suitable network elements and/or interfaces to facilitate communication between entities coupled via the network 16.

As shown in FIG. 1, the computing device 14 is located remotely from the image forming apparatus 12 and communicates with the image forming apparatus 12 over the network 16. Note, however, that the term "remotely" generally refers herein to the computing device 12 being separate from the image forming apparatus 12 and coupled to the image forming apparatus 12 directly or indirectly via any suitable one or more wired and/or wireless connection(s) and/or intermediate device(s)/interface(s).

As shown in FIG. 1, the print document is sent from the computing device 14 over the network 16 to the image forming apparatus 12 for printing. In general, as used herein, the term "print document" refers to a document (or a data file representing the same) that includes print data and other data, such as, for example, additional commands for the image forming apparatus 12 to act upon. Further, as used herein, the term "print data" refers to data to be printed by the image forming apparatus 12. The print data may correspond to any document (or a data file representing the same) that is suitable for printing by the image forming apparatus 12. The print data may be generated, for example, by the application 22, some examples of which include a word processor application (e.g., Microsoft Word®), a presentation application (e.g., Microsoft PowerPoint®), a web browser application (e.g., Internet Explorer®, Safari®, Chrome®, or Firefox®), and a document viewing application (e.g., Adobe Acrobat®).

In order for the image forming apparatus 12 to process and print the print data, the print data may need to be defined in the form of a suitable printer language understood by the image forming apparatus 12, such as any suitable page description language ("PDL") (e.g. PostScript®, KPDL®, PCL®, PCLXL®, etc.). In general, PDL is a higher-level language that describes an appearance/layout of a printed page.

In a typical case, prior to printing, a document generated by the application 22 will be processed by the printer driver 24 to produce print data in the form understood by the image forming apparatus 12. As known in the art, a printer driver generally refers to software that converts data to be printed to the printer-specific format. In this regard, the printer driver 24 may include a general-purpose/universal driver used by an operating system of the computing device 14 or a custom printer driver supplied specifically for use with the image forming apparatus 12 (e.g., a custom driver supplied by a manufacturer for use with particular model(s) of the image forming apparatus 12).

However, in some cases, the image forming apparatus 12 may be capable of understanding the print data output by the application 22 directly, without a need for conversion by the printer driver 24. For example, some printing devices understand Portable Document Format ("PDF") used by applications such Adobe Acrobat®.

As noted above, in addition to the print data, the print document sent by the computing device 14 may contain other data, such various commands for the image forming apparatus 12 to act upon. Such commands may include commands regarding features of a printed document produced on the basis of the print document. To illustrate, when printing a document originating from the application 22, a user may want to change default print settings (e.g., page orientation, page layout, etc.) and/or set optional features (e.g., watermarks) for a printed document. In this regard, the print document may contain suitable PDL commands, proprietary commands, and/or Printer Job Language ("PJL") commands to implement such features.

In particular, PJL is a language that resides above other printer language (e.g., PDL languages, such as PCL) and provides commands to, e.g., control printer language switching between print jobs and change printer configuration. In a typical PJL print job, the PJL commands encapsulate other printer language data (e.g., PDL data).

2. EXAMPLE OPERATION AND DETAILED IMPLEMENTATION i. Overview

In some embodiments, the print data contained in the print document sent by the computing device 14 may include data representing a number of different types of objects that can be printed by the image forming apparatus 12. Such types of objects include, but are not limited to, a drawing object, an image object (or, alternatively, an "image"), and a text object (or, alternatively, "text").

As used herein, a "drawing object" may generally refer to vector graphics object which may be stroked (i.e., outlined) or filled. Some examples of a drawing object include shapes such as a line, a curve, a rectangle, an ellipse, a pie, and a chord. "An image object" may generally refer to a graphical picture that may be defined in a raster format. Further, a "text object" may generally refer one or more text characters, such as characters defined by ASCII code.

Figure 2:
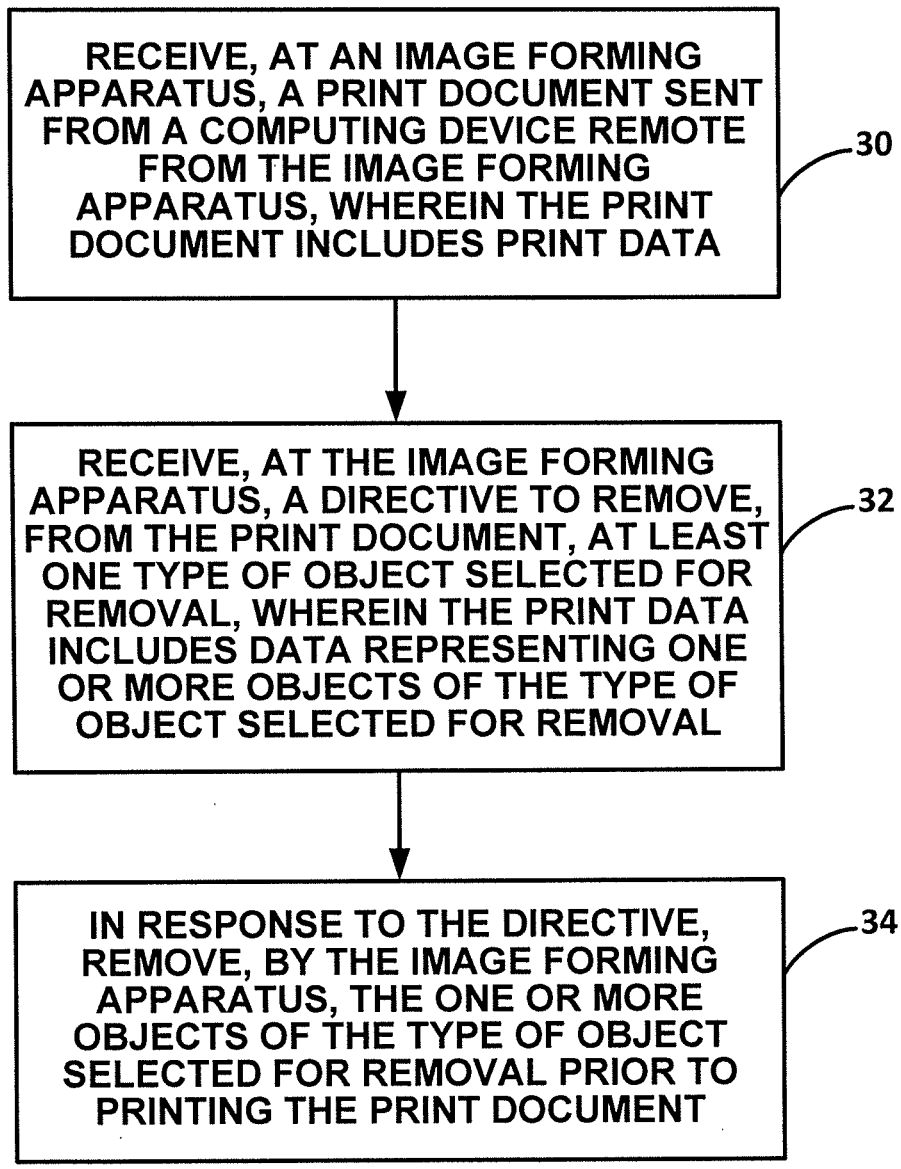
FIG. 2 is a flow chart summarizing a set of functions that can be carried out in the system arrangement of FIG. 1.

As noted above, in some instances, it may be desirable to remove one or more types of objects from the print document prior to printing. FIG. 2 is a flow chart summarizing a set of functions that can be carried out in the system arrangement of FIG. 1.

As illustrated in FIG. 2, step 30 involves receiving, at an image forming apparatus, a print document sent from a computing device remote from the image forming apparatus, wherein the print document includes print data. Step 32 involves receiving, at the image forming apparatus, a directive to remove, from the print document, at least one type of object selected for removal, wherein the print data includes data representing one or more objects of the type of object selected for removal. Then, in response to the directive, step 34 involves removing, by the image forming apparatus, the one or more objects of the type of object selected for removal prior to printing the print document.

In general, the directive to remove, from the print document, the at least one type of object selected for removal may be generated at the computing device and/or at the image forming apparatus.

More particularly, in some embodiments, the directive may comprise an object removal command in the print document, where the object removal command is generated at the computing device. For instance, in the system arrangement of FIG. 1, the object removal command may be generated by the printer driver 24 used by the computing device 14. In one example, the object removal command may be a PJL command. In other embodiments, the directive may comprise an environment value set via an operation panel of the image forming apparatus (e.g., the operation panel 20 of the image forming apparatus 12).

In yet other embodiments, the directive may include a first directive provided via the operation panel of the image forming apparatus (e.g., the operation panel 20 of the image forming apparatus 12) and a second directive provided via the computing device (e.g., the computing device 14). In such case, the image forming apparatus (e.g., the print processing system 18 of the image forming apparatus 12) may be configured to receive the first directive and the second directive, and select the first directive rather than the second directive to remove the one or more objects of the type of object selected for removal.

For instance, the at least one type of object selected for removal may include a first type of object (e.g., a text object) selected for removal and a second, different, type of object selected for removal (e.g., an image object). The first directive may specify the first type of object selected for removal and the second directive may specify the second type of object selected for removal. The image forming apparatus (e.g., the print processing system 18 of the image forming apparatus 12) may be configured to select the first directive rather than the second directive, and in response to the first directive, remove one or more objects of the first type of object selected for removal prior to printing the print document.

Further, the directive may be produced in response to one or more selection inputs indicating one or more types of objects to be removed from the print document. The selection input(s) may be provided via a suitable user interface (e.g., a graphical user interface ("GUI")), such as a user interface on the operation panel 20 (e.g., a touch screen user interface) and/or the computing device 12.

With a benefit of the process of FIG. 2, when the print document is printed by the image forming apparatus 12 to produce a printed document, the printed document will no longer contain object(s) of the type of object selected for removal. Advantageously, the printed document may contain only those type(s) of object(s) that a user wants to print (e.g., text objects), while removing one or more other types of objects that the user wants to discard (e.g., image and/or drawing objects).

Further, an option to remove objects from the print document may be provided in multiple ways, such as via the computing device 14 and/or via the operation panel 20 of the image forming apparatus 12. As noted above, if the image forming apparatus 12 receives two object removal directives from two different places, the image forming apparatus 12 may be configured to apply an order of precedence to those directives, prioritizing one directive over another directive.

ii. Print Processing System

Figure 3:
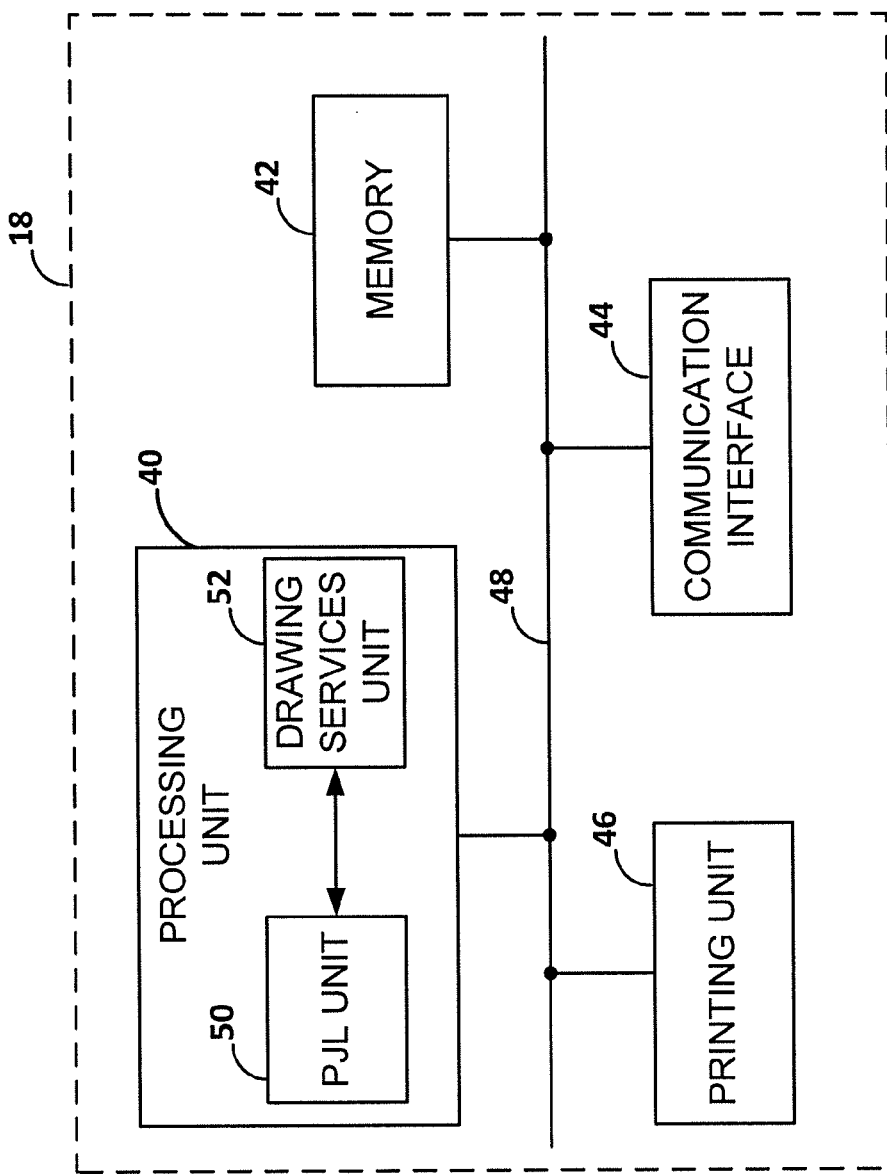
FIG. 3 illustrates further details of the print processing system of the image forming apparatus of FIG. 1.

Various functions described herein may be carried out at the image forming apparatus 12, such as by the print processing system 18. FIG. 3 illustrates further details of the print processing system 18 of the image forming apparatus 12 of FIG. 1.

As illustrated in FIG. 3, the print processing system 18 includes a processing unit 40, memory 42, a communication interface 44, and a printing unit 46, all connected together via a system bus or other mechanism 48. The processing unit 40 further includes a number of other units including a PJL unit 50 and a drawing services unit 52.

However, it should be understood that this system arrangement is shown for purpose of example only, and the print processing system 18 may also include other components not shown in FIG. 3.

In general, the processing unit 40 may comprise one or more processors including one or more central processing units (CPUs), general purpose processors, and/or dedicated processors (e.g., application specific integrated circuits (ASICs) or digital signal processors (DSPs)). The memory 42 may be one or more non-transitory computer-readable media, and can be a volatile and/or nonvolatile type of data storage (e.g., Read-Only Memory (ROM), Random Access Memory (RAM), and/or the like). Further, the memory 42 may store program logic including program instructions (e.g., machine language instructions or any other higher-level programming instructions) executable by the processing unit 40 to carry out various functions described herein. The memory 42 can also store other data used by such program logic.

Additionally, the memory 42 may also include storage area(s) (e.g., buffer memory) for storing incoming print documents received by the communication interface 44 from the computing device 14. The memory 42 can also store various operational parameters and settings of the image forming apparatus 12.

For example, various features available at the image forming apparatus 12 can be set by operating the operation panel 20. Generally, printer settings can be collectively referred to as a print environment. For example, in the context of PJL, the image forming apparatus 12 can maintain a so-called User Default Environment which can hold environment values corresponding to settings set from the operation panel 20. A user can change or set an environment value by providing inputs via the operation panel 20, such as by pressing soft/hard control keys, etc. These environment values may be normally stored in a non-volatile memory, such as a non-volatile RAM.

Within the processing unit 40, each of the PJL unit 50 and drawings services unit 52 may be a logical unit implemented in software/firmware executed by the processing unit 40 or may be a dedicated processing unit (e.g., an ASIC). In general, the PJL unit 50 may be programmed to execute various PJL commands, such as PJL command(s) contained in the print document received from the computing device 14 (e.g., an object removal command), to read from the memory 42 environment values set via the operation panel 20 as current feature settings to be applied to the print document, and to execute other various functions described herein.

The PJL unit 50 can also be configured to determine which interpreter (not shown) should translate the print document from a high-level printer language (e.g., one of the types of PDL) used in the print document to an intermediate format, and pass the print document to the drawing services unit 52 for further processing.

The drawing services unit 52 may include a number of different units configured to process the print document (e.g., convert print data in the print document to any suitable intermediate data (e.g., raster/pixel format, etc.) for printing by the printing unit 46. Although not shown, the drawings services unit 52 may include separate units for processing different types of objects included in the print data, such as a drawing unit, a text unit, and an image unit.

In this regard, the drawing services unit 52 may receive objects in the print data tagged as different types of objects (e.g., a text object, an image object, and a drawing object), and pass objects of a given type for further processing by a respective unit. For example, the drawing unit may be configured to process drawing objects, the text unit may be configured to process text objects, and the image unit may be configured to process image objects. Further, the drawings services unit 52 may be configured to execute commands/values received from the PJL unit 50 and remove a given type of object from the print document in accordance with the commands/values received from the PJL unit 50.

Once the print document is processed by the drawing services 52, it may be passed to the printing unit 46 for printing a printed document based on the print document. In this regard, although not shown, the processing unit 40 may include an order generation unit configured to generate printing commands for drawing objects processed by the drawing services unit 52. Further, although not shown, the printing unit 46 may include a printer engine that physically prints the printed document.

iii. Directive to Remove Selected Type of Object

As discussed above, a directive to remove one or more types of objects selected for removal from a print document may comprise an object removal command in a print document, and may be generated at a computing device, such as the computing device 14 in the arrangement of FIG. 1.

More specifically, in some embodiments, the object removal command may be generated by the printer driver 24 and included in the print document. As discussed above, a document generated by the application 22 may be processed by the printer driver 24 to produce the print document in the form understood by the image forming apparatus 12.

In such case, the printer driver software may be configured with additional program instructions to include the object removal command in the print document. In one embodiment, the object removal command is a PJL command. It will be appreciated that the PJL command may be added to print documents containing print data defined using a number of different printer languages.

Figure 4:
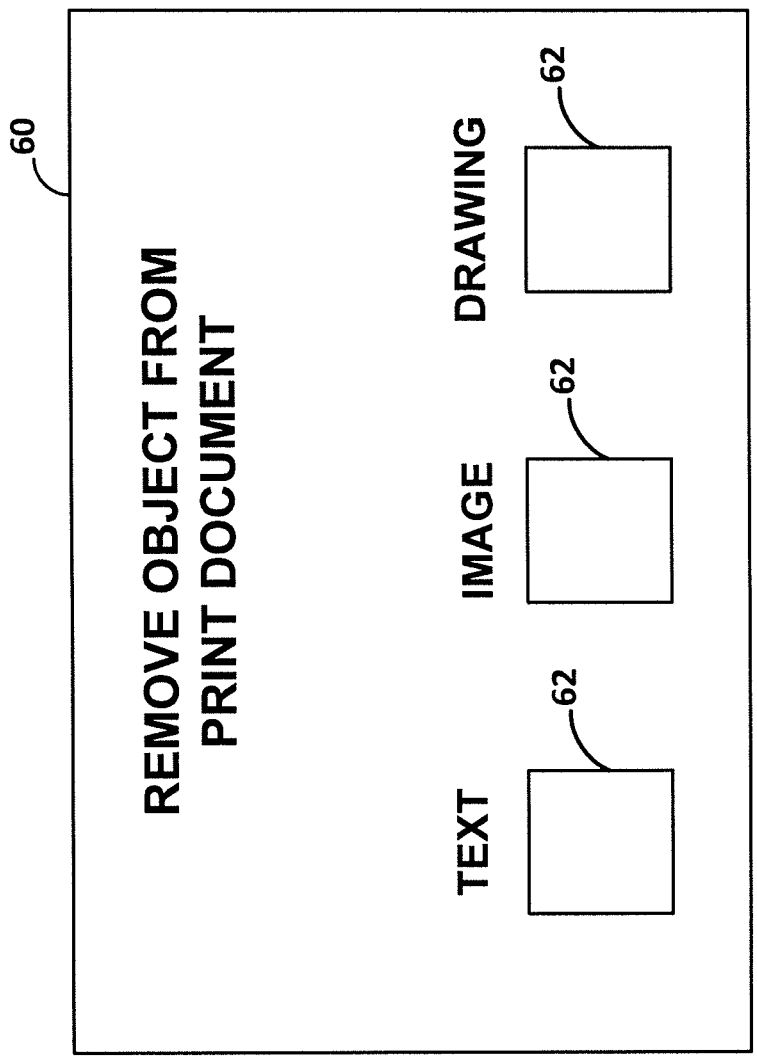
FIG. 4 illustrates a graphical user interface ("GUI") embodiment for selecting one or more types of objects to be removed from a print document.

The object removal command may be produced in response to one or more selection inputs indicating one or more types of objects to be removed from the print document. FIG. 4 illustrates an embodiment of a graphical user interface ("GUI") 60 for selecting one or more types of objects to be removed from a print document.

As shown in FIG. 4, the GUI 60 includes names of three different types of objects (i.e., "text," "image," and "drawing") and a checkbox 62 underneath each object name. A user has an option to select one or more types of objects for removal by checking respective checkboxe(s) 62 using, e.g., a suitable input device (e.g., a mouse, a stylus, a touch screen, etc.). Although it is feasible that the user could select all of the object types for removal, in some embodiments, the GUI 60 may be configured such that the user will not be able to select all of the object types to remove from the print document.

Figure 6:
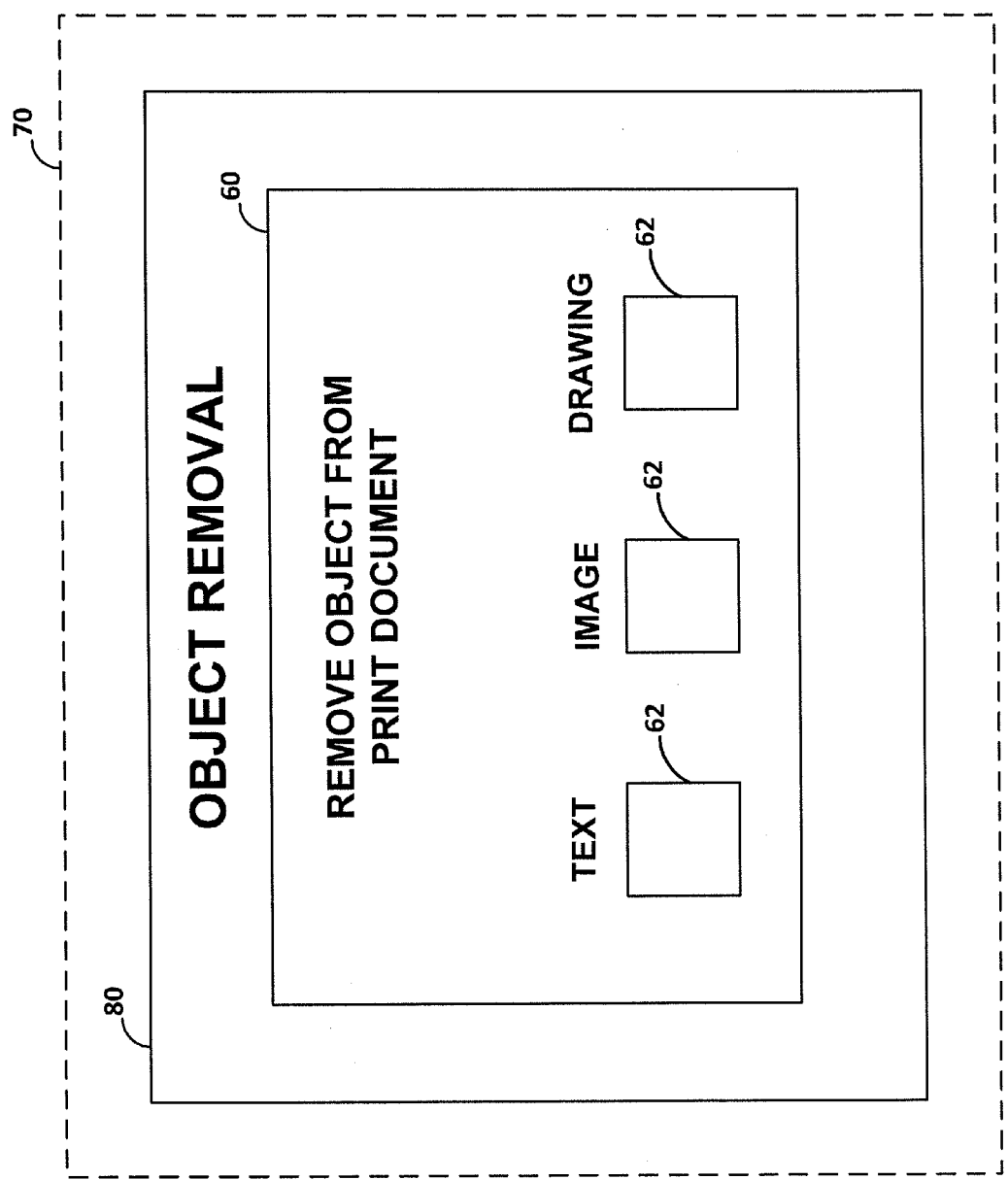
FIG. 6 illustrates a screen embodiment which includes the GUI of FIG. 4.

However, in other embodiments, the GUI 60 may be configured differently than shown in FIG. 6. Further, selection input(s) indicating one or more types of objects to be removed from the print document may be provided in a different manner than described in connection with in FIG. 6.

Figure 5:
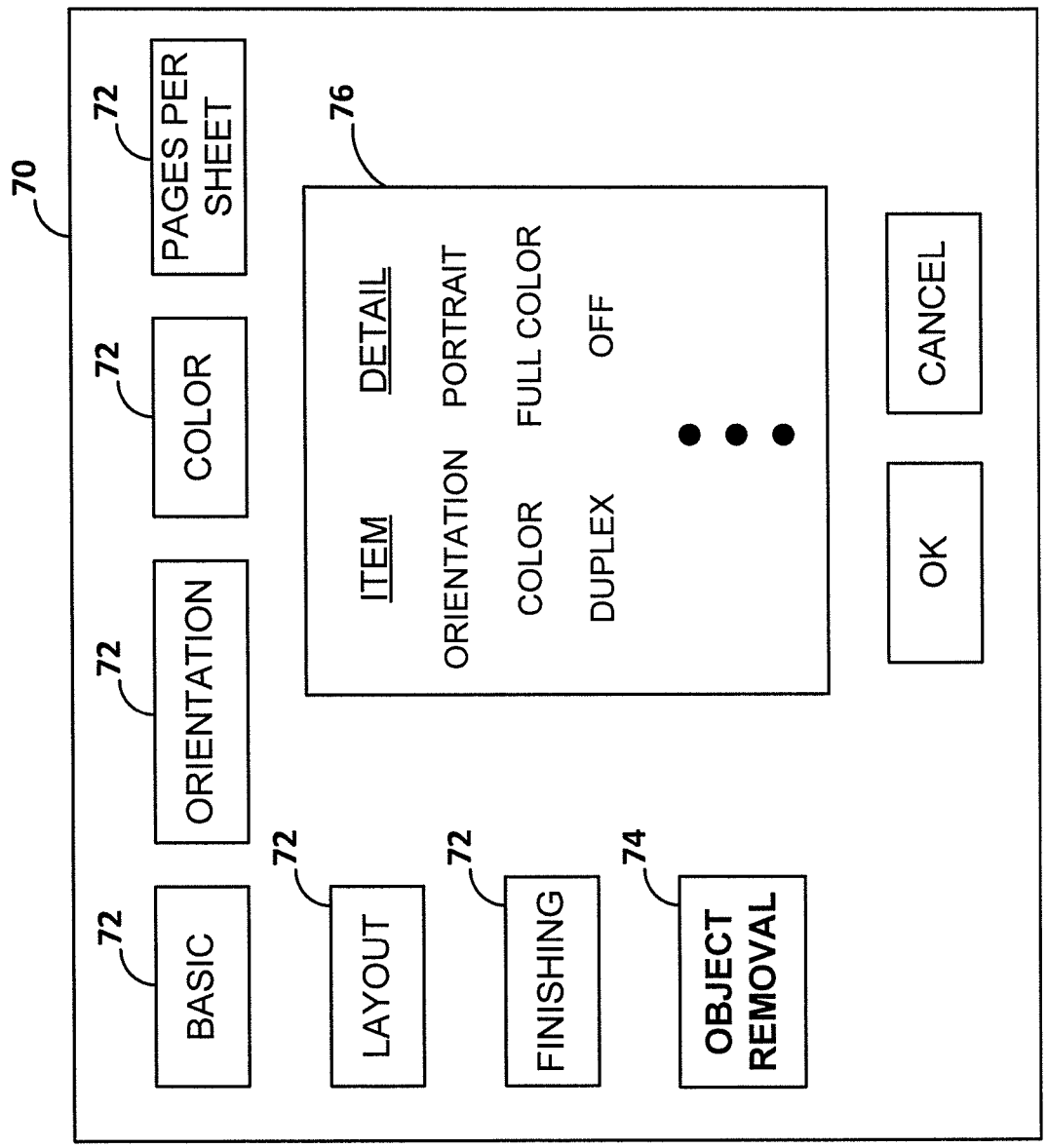
FIG. 5 illustrates a screen embodiment which includes an object removal option.

The GUI 60 may be included in any suitable print-related screen, such as, for example, a printer-properties screen generated by the printer driver 24 and indicating various properties and available print features of the image forming apparatus 12. A user, for example, can use such screen to configure a print job with desired features. FIG. 5 illustrates an embodiment of a screen 70 that includes an object removal option. The screen 70 may include tabs 72 providing various options regarding customizing a print job. As shown in FIG. 5, in accordance with the embodiment, the screen 70 additionally includes an object removal tab 74 providing an option to remove given type(s) of object(s).

Further, the screen 70 may include a window 76 providing a summary of current properties set for printing a given print document. Once a user selects the object removal tab 74, another screen that includes the GUI 60 may be displayed within a portion of the screen 70. FIG. 6 illustrates an embodiment of a screen 80 that includes the GUI 60. A user can then select, via the GUI 60, one or more types of objects to be removed from a print document to be sent for printing.

However, in alternative embodiments, it may be possible to include the GUI 60 or the like in a different print-related screen. In one example, such screen may be a basic print screen that includes a pull-down list of available printing devices from which a user can choose a printing device and that has a "Print" button that the user can select after choosing one of the available printing devices form the pull-down list.

As noted above, the object removal command may be produced in response to one or more selection inputs that indicate type(s) of object(s) to be removed from the print document, such as input(s) provided via the GUI 60. The following provide examples of commands that may be generated by the printer driver 24 using PJL code. In the following examples, the PJL "SET" command is used. As a general matter, the "SET" command may be used to set one or more new features for a given print job.

The selection of "text" object removal option from the GUI 60 may cause the printer driver 24 to generate the following object removal command in the print document:
   @PJL SET KOBJECTREMOVAL=TEXT
The selection of "image" object removal option from the GUI 60 may cause the printer driver 24 to generate the following object removal command in the print document:
   @PJL SET KOBJECTREMOVAL=IMAGE
The selection of "drawing" object removal option from the GUI 60 may cause the printer driver 24 to generate the following object removal command in the print document:
   @PJL SET KOBJECTREMOVAL=DRAWING
The selection of "text and drawing" object removal options from the GUI 60 may cause the printer driver 24 to generate the following object removal command in the print document:
   @PJL SET KOBJECTREMOVAL=TEXT_DRAWING
The selection of "text and image" object removal options from the GUI 60 may cause the printer driver 24 to generate the following object removal command in the print document:
   @PJL SET KOBJECTREMOVAL=TEXT_IMAGE
The selection of "image and drawing" object removal options from the GUI 60 may cause the printer driver 24 to generate the following object removal command in the print document:
   @PJL SET KOBJECTREMOVAL=IMAGE_DRAWING
In other embodiments, a directive to remove one or more selected types of objects from a print document may comprise an environment value set via an operation panel of an image forming apparatus, such as the operation panel 20 of the image forming apparatus 12 in the arrangement of FIG. 1.

In this regard, the operation panel 20 may be configured with a similar GUI as that shown in FIG. 4. The operation panel 20 may include a display device configured to display the GUI 60 for receiving inputs indicative of object removal selections.

Figure 7:
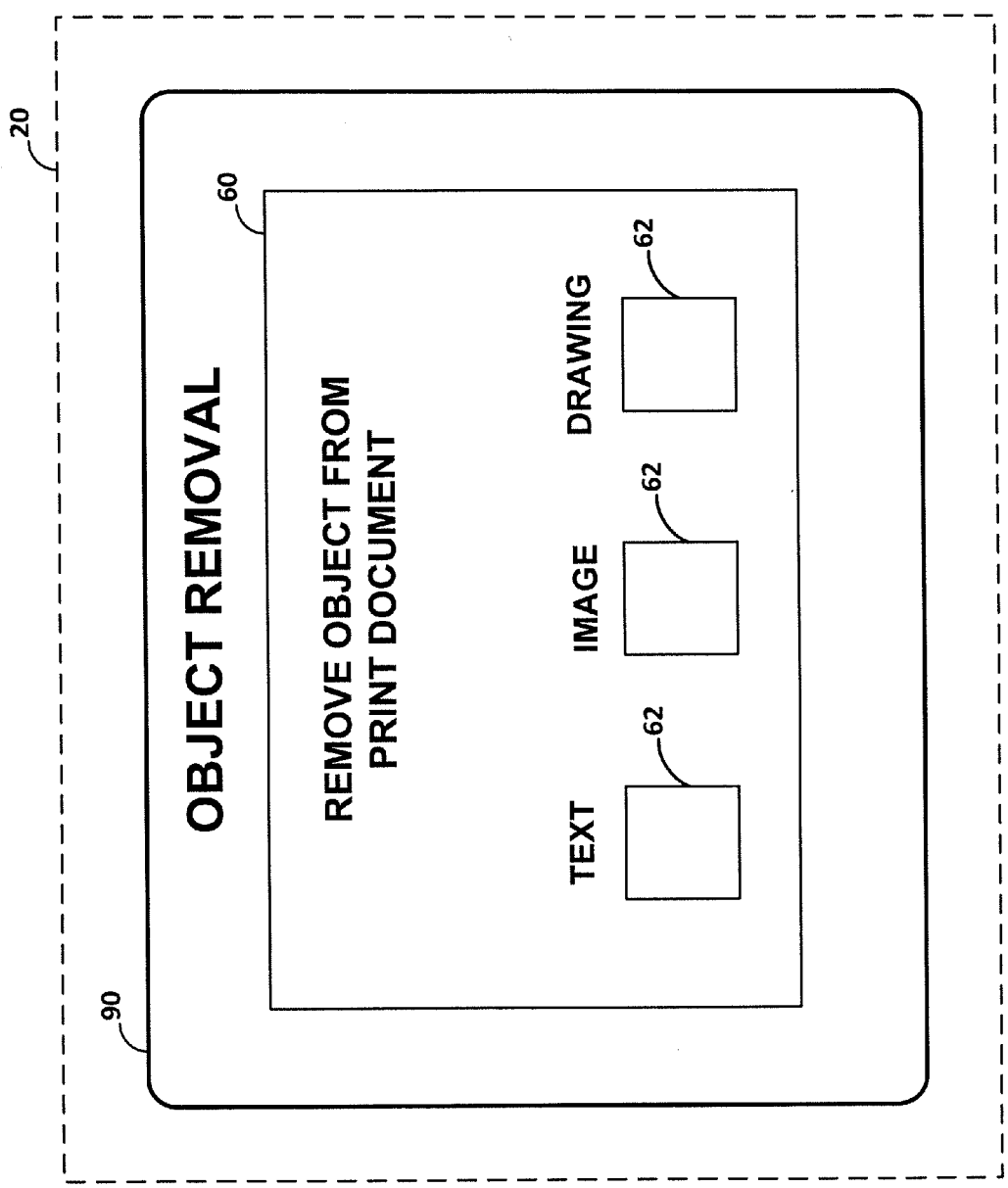
FIG. 7 illustrates an example of a portion of an operation panel configured to display the GUI of FIG. 4.

FIG. 7 illustrates an example of a portion of the operation panel 20 configured to display the GUI 60. As shown in FIG. 7, the operation panel 20 may include a display device 90 (e.g., an LCD, a touch screen, etc.) that may display the GUI 60. Object removal selection(s) may be made using any suitable input means (e.g., a touch input, a mouse, etc.) by checking respective checkboxe(s) 62.

In this regard, one or more object removal selection inputs received via the operation panel 20 may be communicated to the processing unit 40 that, in turn, may be configured (e.g., programmed with suitable program logic) to responsively set one or more environment values according to the one or more object removal selections inputs. The processing unit 40 may store the environment value(s) in the memory 42. In this regard, the memory 42 may include a non-volatile RAM, and the environment value(s) may be stored in the non-volatile RAM. The PJL unit 50 can subsequently read the stored environment value(s) from the non-volatile RAM during processing of a print document submitted for printing. As will be described later, the PJL unit 50 will subsequently set an object removal value in accordance with an environment value set via the operation panel 20 for further print processing by the drawing services unit 22. The memory 42 may further include a data storage element separate from a data storage element holding the environment value(s) (e.g., the non-volatile RAM), and the PJL unit 50 can store the object removal value in such data storage element.

The following provide examples of a code that may be generated by the processing unit 40 to set respective environment values corresponding to different object removal options. Note that the following examples include code annotations for illustrative purposes only. The annotations may be omitted in the actual code.

The selection of "text" object removal option in the operation panel 20 sets the following environment value:
   #define ENV_V_OBJECTREMOVAL_TEXT 1 //Remove text object
The selection of "image" object removal option in the operation panel 20 sets the following environment value:
   #define ENV_V_OBJECTREMOVAL_IMAGE 2 //Remove image object
The selection of "drawing" object removal option in the operation panel 20 sets the following environment value:
   #define ENV_V_OBJECTREMOVAL_DRAWING 3 //Remove drawing object
The selection of "text and image" object removal option in the operation panel 20 sets the following environment value:
   #define ENV_V_OBJECTREMOVAL_TEXT_IMAGE 4 //Remove text & image object
The selection of "text and drawing" object removal option in the operation panel 20 sets the following environment value:
   #define ENV_V_OBJECTREMOVAL_TEXT_DRAWING 5 //Remove text & drawing object
The selection of "image and drawing" object removal option in the operation panel 20 sets the following environment value:
   #define ENV_V_OBJECTREMOVAL_IMAGE_DRAWING 6 //Remove image & drawing iv. Object Removal Operation

In some embodiments, a selection of one or more types of objects to be removed from a print document may be made at the computing device 14. In other embodiments, the selection may be made instead at the operation panel 20 of the image forming apparatus 12. In yet other embodiments, the selection may be made both at the computing device 14 and at the operation panel 20 of the image forming apparatus 12.

For example, in some embodiments, an option to select one or more types of objects to be removed from a print document may not be available at the computing device 14 when the printer driver 24 is not associated with a manufacturer of the image forming apparatus 12 (e.g., the printer driver 24 is not a custom printer driver provided by the manufacturer of the image forming apparatus 12). In such case, the printer driver 24 would not include an object removal command in a print document generated by the printer driver 24.

Instead, the object removal selection(s) may be made at the operation panel 20 of the image forming apparatus 12. As described above, a directive to remove the selected types of objects from the print document may be responsively produced in the form of an environment value that the PJL unit 50 could read and process accordingly.

Figure 8:
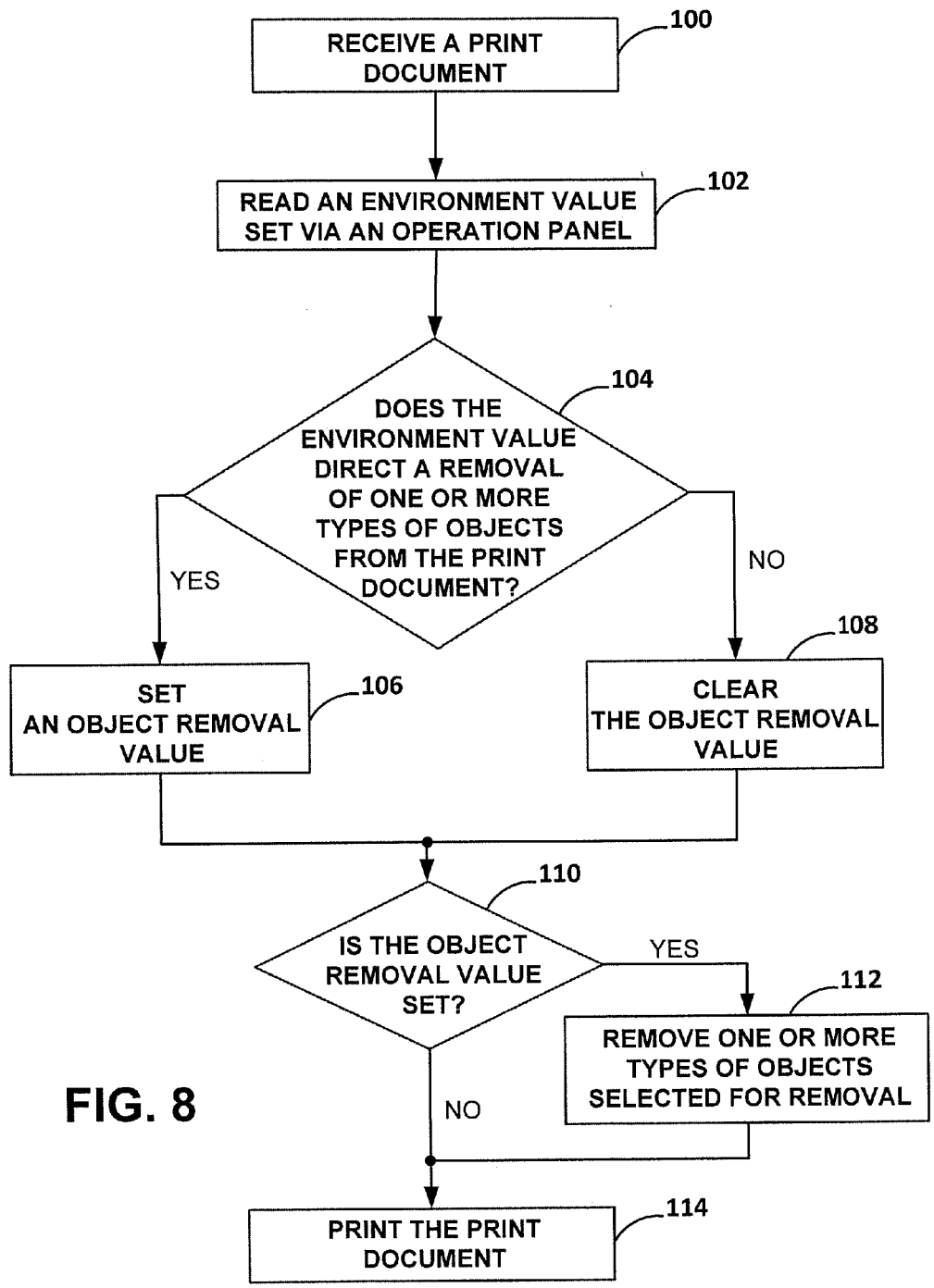
FIG. 8 is a flow chart illustrating a set of functions for processing an environment value set via an operation panel of an image forming apparatus, in accordance with a method embodiment.

FIG. 8 is a flow chart illustrating a set of functions for processing an environment value set via an operation panel of an image forming apparatus, in accordance with a method embodiment. For illustrative purposes, the process of FIG. 8 is carried out by the print processing system 18 of the image forming apparatus 12, as shown in FIG. 3.

At step 100, the PJL unit 50 receives a print document. At step 102, the PJL unit 10 reads an environment value set via the operation panel 20. In this regard, the environment value may be set in response to one or more selections inputs provided via the operation panel 20. Further, as described above, the PJL unit 50 may be programmed to read from the memory 42 environment values set via the operation panel 20 as current feature settings to be applied to the print document. At step 104, the PJL unit 50 determines whether the environment value directs a removal one or more types of objects from the print document.

If the environment value directing object removal is set, at step 106, the PJL unit 50 sets an object removal value in accordance with the environment value for further print processing by the drawing services unit 52. The object removal value may be any suitable value interpreted by the drawing services unit 52 to mean that one or more specified type(s) of object(s) are to be removed from the print document prior to printing. Some examples of the object removal value may include "TEXT," "IMAGE," "DRAWING," "TEXT_IMAGE," "TEXT_DRAWING," and "IMAGE_DRAWING."

As discussed above, the drawings services unit 52 may be configured to process different types of objects included in print data prior to generating a printed document. In this regard, the drawing services unit 52 may receive the objects tagged as different types of objects (e.g., a text object, an image object, and a drawing object) and may process those different types of objects according to commands/values received from the PJL unit 50. For example, if the environment value is a directive to remove image objects, then in response to the object removal value set by the PJL unit 50, the drawing services unit 52 may remove any image object present in the print document prior to printing.

If the environment value directing object removal is not set, at step 108, the PJL unit 50 clears the object removal value. At step 110, the drawing services unit 52 determines whether the object removal value is set. If the object removal value is set, at step 112, the drawing services unit 52 removes one or more types of objects selected for removal in accordance with the object removal value. For instance, the drawing services unit 52 may remove all image objects from print data of the print document if the object removal value is indicative of an image object removal. Then, at step 114, the print document is printed (e.g., by the printing unit 46) with the selected type(s) of object(s) removed. If the object removal value is not set, the process moves to step 114 at which the print document is printed without any objects removed.

In other embodiments, a selection of one or more types of objects to be removed from a print document may be made at the computing device 14. In yet other embodiments, the selection may be made both at the computing device 14 and at the operation panel 20 of the image forming apparatus 12.

When the selection to remove one or more types of objects is made at the computing device 14, the printer driver 24 may generate an object removal command (e.g., the object removal command in PJL) that the printer driver 24 includes in a print document to be printed. For example, in some embodiments, an option to select one or more types of objects to be removed from the print document may be available at the computing device 14 when the printer driver 24 is associated with a manufacturer of the image forming apparatus 12 (e.g., a custom printer driver provided by the manufacturer of the image forming apparatus 12). In such case, the printer driver 24 would include the object removal command in the print document generated by the printer driver 24.

Additionally, object removal selection(s) may be made at the operation panel 20 of the image forming apparatus 12, as described above. In such case, when the image forming apparatus 12 receives two different directives to remove selected types of objects from the same print document, the image forming apparatus 12 may select one directive over another directive.

Figure 9:
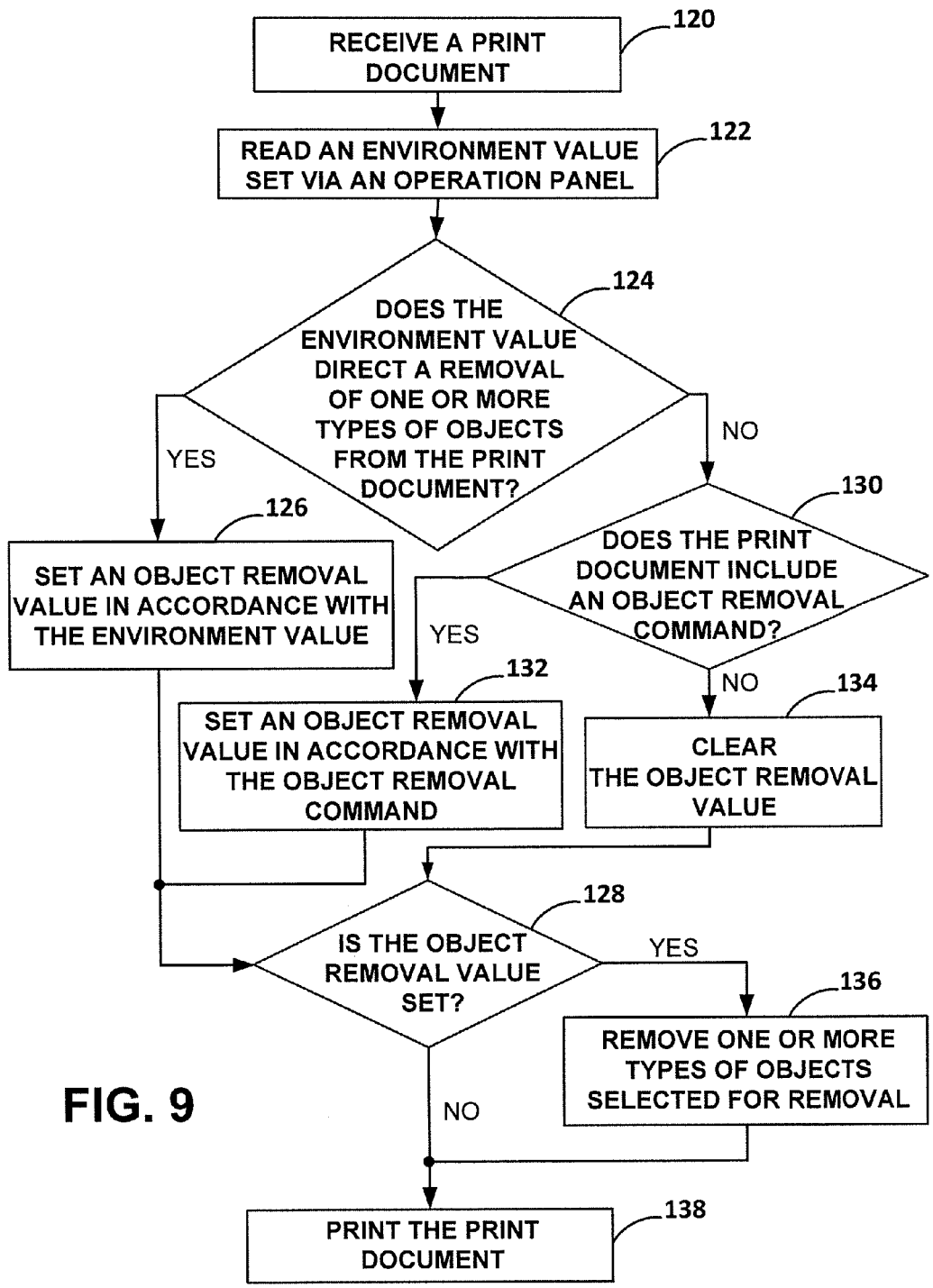
FIG. 9 is a flow chart illustrating a set of functions for processing one or more directives to remove selected object type(s), in accordance with a method embodiment.

FIG. 9 is a flow chart illustrating a set of functions for processing one or more directives to remove selected object type(s), in accordance with a method embodiment. In the example embodiment, for illustrative purposes, the process of FIG. 8 is carried out by the print processing system 18 of the image forming apparatus 12, as shown in FIG. 3.

At step 120, the PJL unit 50 receives a print document. At step 122, the PJL unit 50 reads an environment value set via the operation panel 20. At step 124, the PJL unit 50 determines whether the environment value directs a removal one or more types of objects from the print document. If the environment value directing object removal is set, at step 126, the PJL unit 50 sets an object removal value in accordance with the environment value for further print processing by the drawing services unit 52. At this point, the PJL unit 50 does not check whether the print document includes an object removal command. The environment value set via the operation panel 20 takes precedence and overrides any object removal command that might be included in the print document. The process then moves to step 128 at which the drawing services unit 52 determines whether the object removal value is set.

If, however, the environment value directing object removal is not set, then, at step 130, the PJL unit 50 determines whether the print document includes an object removal command. If the print document includes the object removal command, at step 132, the PJL unit 50 sets an object removal value in accordance with the object removal command for further print processing by the drawing services unit 52. If the print document does not include the object removal command, at step 134, the PJL unit 50 clears the object removal value. Following the steps 132 and 134, the process moves to step 128 at which the drawing services unit 52 determines whether the object removal value is set.

If the object removal value is set, at step 136, the drawing services unit 52 removes one or more types of objects selected for removal in accordance with the object removal value. For instance, the drawing services unit 52 may remove all image objects from print data of the print document. Then, at step 138, the print document is printed (e.g., by the printing unit 46) with the selected type(s) of object(s) removed. If the object removal value is not set, the process moves to step 138 at which the print document is printed without any objects removed.

Table 1 summarizes which object removal value will take effect for removing one or more given types of objects when a directive to remove the one or more given types of objects is provided as an operation panel environment value, an object removal command in a print document, and/or as both.

with the manufacturer of the image forming apparatus and print documents generated from a printer driver associated with the manufacturer of the image forming apparatus.

In another example, a user might save at a computing device a print document that includes an object removal command, as in the case of the print document generated by a printer driver associated with a manufacturer of an image forming apparatus. The object removal command may call for removal of certain types of objects (e.g., text and drawing objects). In this case, the user may also have an option to make object removal selections via an operation panel of the image forming apparatus.

Advantageously, the user can send the saved print document to the image forming apparatus multiple times, choosing a different object removal option on the operation panel each time. As explained above in connection with the process of FIG. 9, the object removal selections set via the operation panel would override the object removal command in the print document. Hence, the user may not have to re-generate the print document at the computing device each time the user wishes to change object removal options set in the print document.

Note that although example embodiments have been described above, variations are possible. To illustrate, in one

TABLE 1

| OPERATION PANEL ENVIRONMENT VALUE | OBJECT REMOVAL COMMAND IN A PRINT DOCUMENT | OBJECT REMOVAL VALUE |
|---|---|---|
| ENV_V_OBJECTREMOVAL_TEXT | ANY | TEXT |
| ENV_V_OBJECTREMOVAL_IMAGE | ANY | IMAGE |
| ENV_V_OBJECTREMOVAL_DRAWING | ANY | DRAWING |
| ENV_V_OBJECTREMOVAL_TEXT_IMAGE | ANY | TEXT_IMAGE |
| ENV_V_OBJECTREMOVAL_TEXT_DRAWING | ANY | TEXT_DRAWING |
| ENV_V_OBJECTREMOVAL_IMAGE_DRAWING | ANY | IMAGE_DRAWING |
| NONE | TEXT | TEXT |
| NONE | IMAGE | IMAGE |
| NONE | DRAWING | DRAWING |
| NONE | TEXT_IMAGE | TEXT_IMAGE |
| NONE | TEXT_DRAWING | TEXT_DRAWING |
| NONE | IMAGE_DRAWING | IMAGE_DRAWING |
| NONE | NONE | NONE |

Hence, according to the example embodiment illustrated in FIG. 8, an object removal choice set via the operation panel 20 will take precedence and override any object removal choice set via the printer driver 24. The object removal choice set via the printer driver 24 will become valid only when the object removal choice is not set via the operation panel 20. However, in alternative embodiments, it may be possible to process multiple object removal directives for the same print document in other ways than those described herein.

As described above, object removal selections made via operation panel settings may have a priority over object removal selections made via printer driver settings. This prioritization scheme may provide a number of advantages.

In one example, a print document may be generated from a printer driver not associated with a manufacturer of an image forming apparatus. Hence, in accordance with some of the embodiments described herein, such print document may not contain an object removal command. In this case, a decision to remove selected types(s) of object(s) would be based only on selections made via control panel settings. This can provide object removal consistency across print documents generated from the printer driver not associated or more alternative embodiments, it may be possible to include an object removal command in a print document in a different way than described above.

As one example, if the image forming apparatus 12 includes a PostScript® interpreter, the object removal command may be added as an additional feature to a PostScript printer description file ("PPD file"). Application programs, such as the application 22, may parse a PPD file and build a user interface from a list of features found in the PPD file. When a feature is selected from the user interface, code for the selected feature can be extracted from the PPD file and included in a print document. This may be useful when the printer driver 24 is a universal printer driver provided by an operating system of the computing device 14 or when the application 22 is capable of generating the print document directly without the use of the printer driver 24.

In one or more other alternative embodiments, the printer driver 24 may be configured not to generate one or more types of objects that are selected for removal. As such, a print document sent for printing to the image forming apparatus 12 would not contain the selected type(s) of object(s). In this regard, the printer driver software may be configured with additional program instructions not to generate data corresponding to an object of the type of object selected for removal.

v. Working Examples

As discussed hereinbefore, an ability to remove certain types of objects may be useful for a number of reasons. For example, a user may want to discard one or more types of objects from a print document to emphasize object enhancements made to the print document by removing other types of objects. This feature may be useful, e.g., for architects and designers to separate their work from existing graphics. In another example, a user may wish to save toner by not printing objects a user is not interested and/or to improve performance of a printing device by not rendering objects that are not needed. The following illustrate some examples of situations in which object removal features of the present disclosure may be applied.

Figure 10:
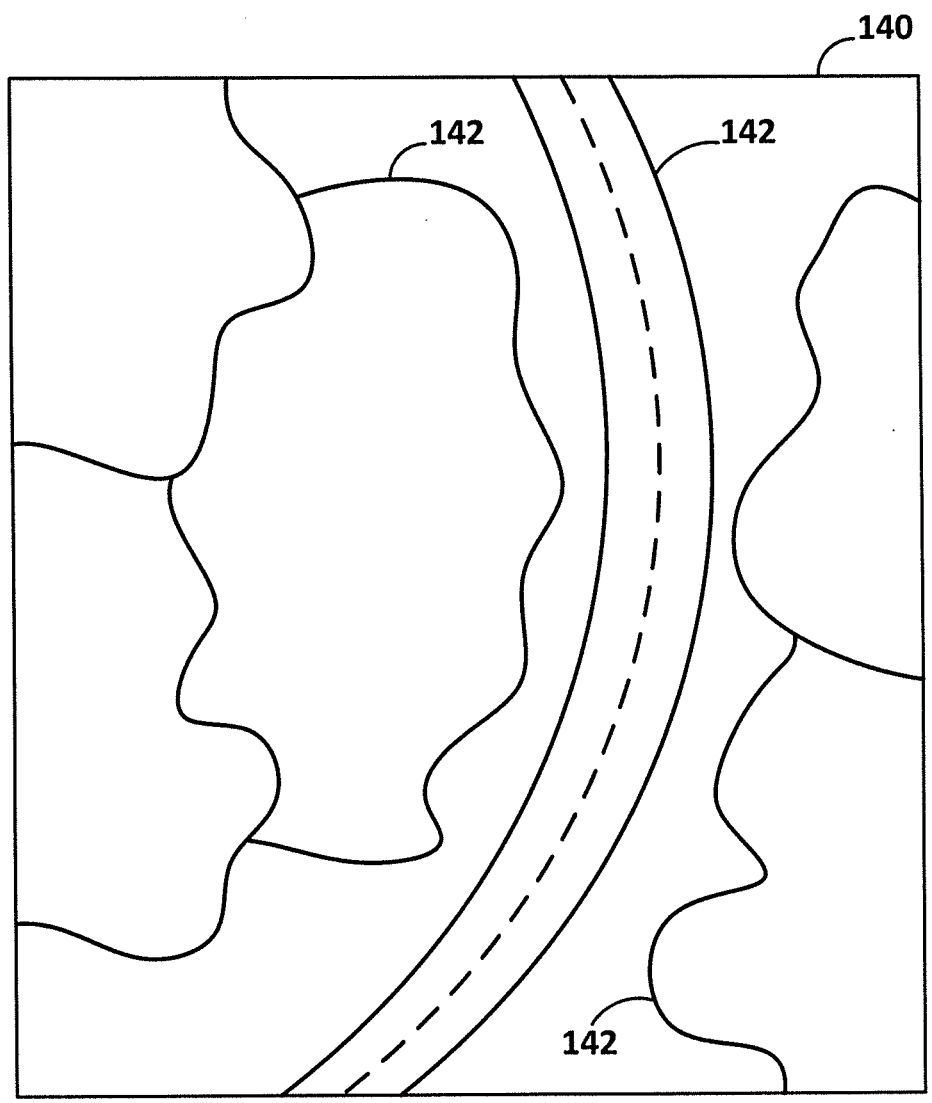
FIG. 10 illustrate an example of an original document to be enhanced with additional objects.
Figure 11:
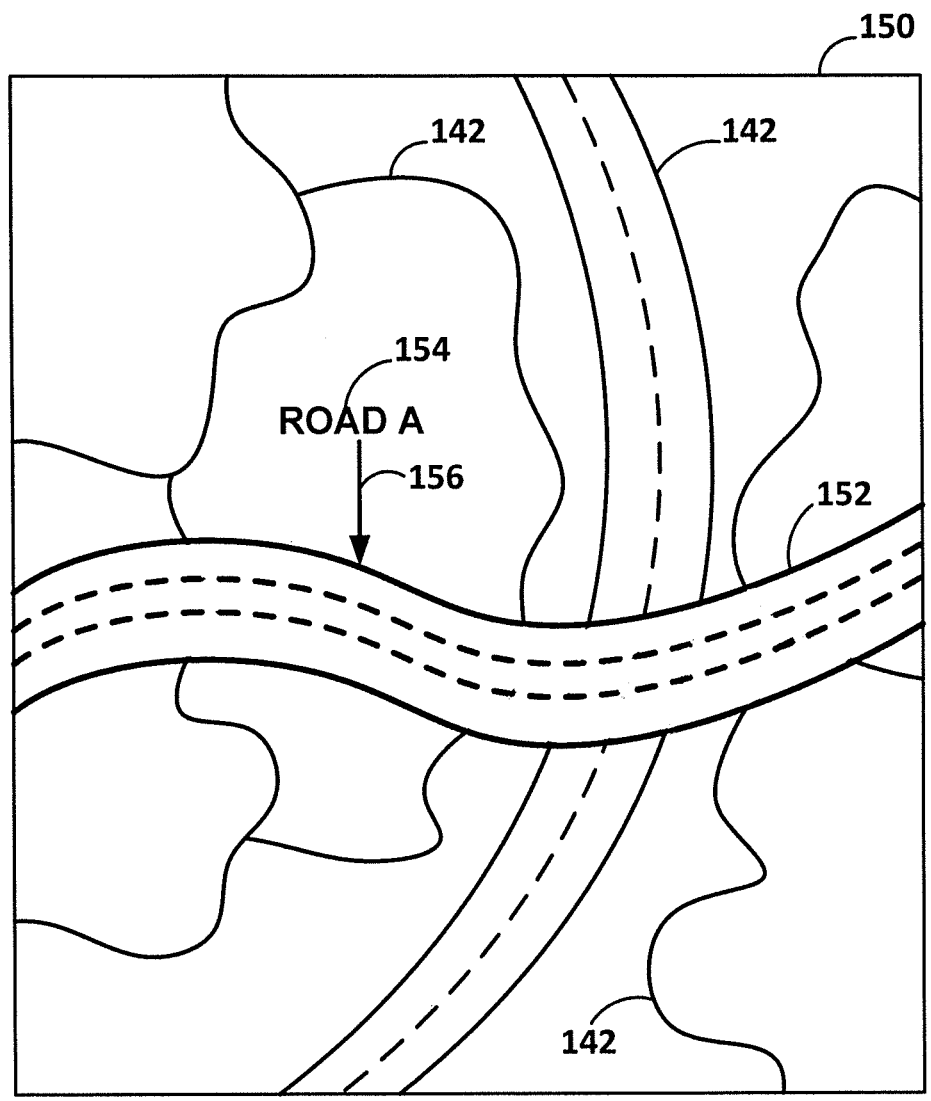
FIG. 11 illustrates an example of a document that has been enhanced with additional objects without removing image objects in the original document of FIG. 10.
Figure 12:
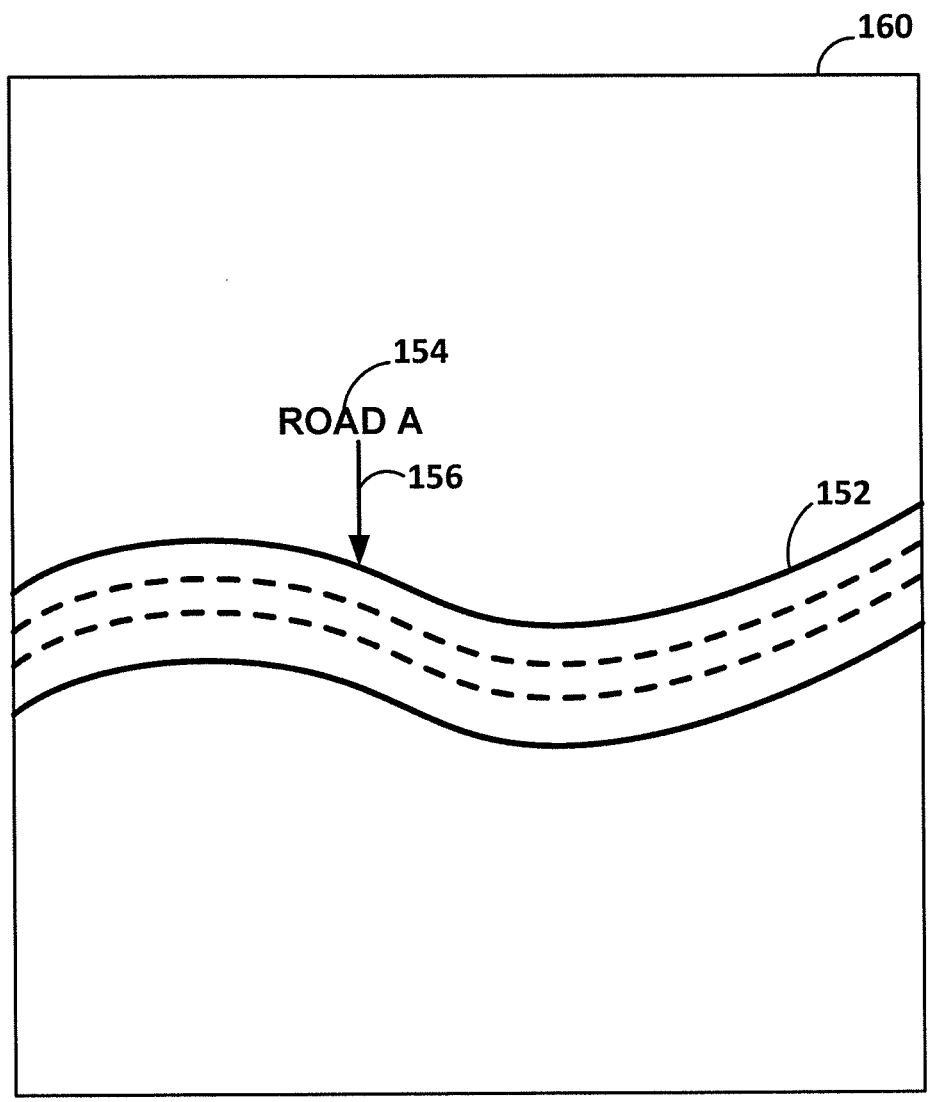
FIG. 12 illustrates an example of a document that has been printed after the image objects are removed from the original document of FIG. 10 in accordance with a selected object removal option.

FIG. 10 illustrates an example of an original document 140 to be enhanced with additional objects. As shown in FIG. 10, the original document 140 includes a number of image objects 142. FIG. 11 illustrates an example of a document 150 that has been enhanced with objects 152-156 without removing any of the image objects 142 in the original document 140. FIG. 12 illustrates an example of a document 160 that has been printed after the image objects 142 are removed from the original document of FIG. 10 in accordance with a selected object removal option.

Namely, in accordance with the principles described herein, a user can select an option to remove image objects from the original document 140. Subsequently, objects of an image type selected for removal are removed from the original document 140 prior to printing. Hence, after printing, the document 160 no longer contains the image objects 142 and shows only the enhancements in the form of the objects 152-156.

As shown in FIG. 12, the image objects 142 are no longer present in the document 160 so that enhancements to the original document 140 can be emphasized. Hence, with a benefit of the present disclosure, a user has the flexibility to enhance an original document and remove, e.g., any background images. As a result, a printed document will only show the enhancements to the original document.

Figure 13:
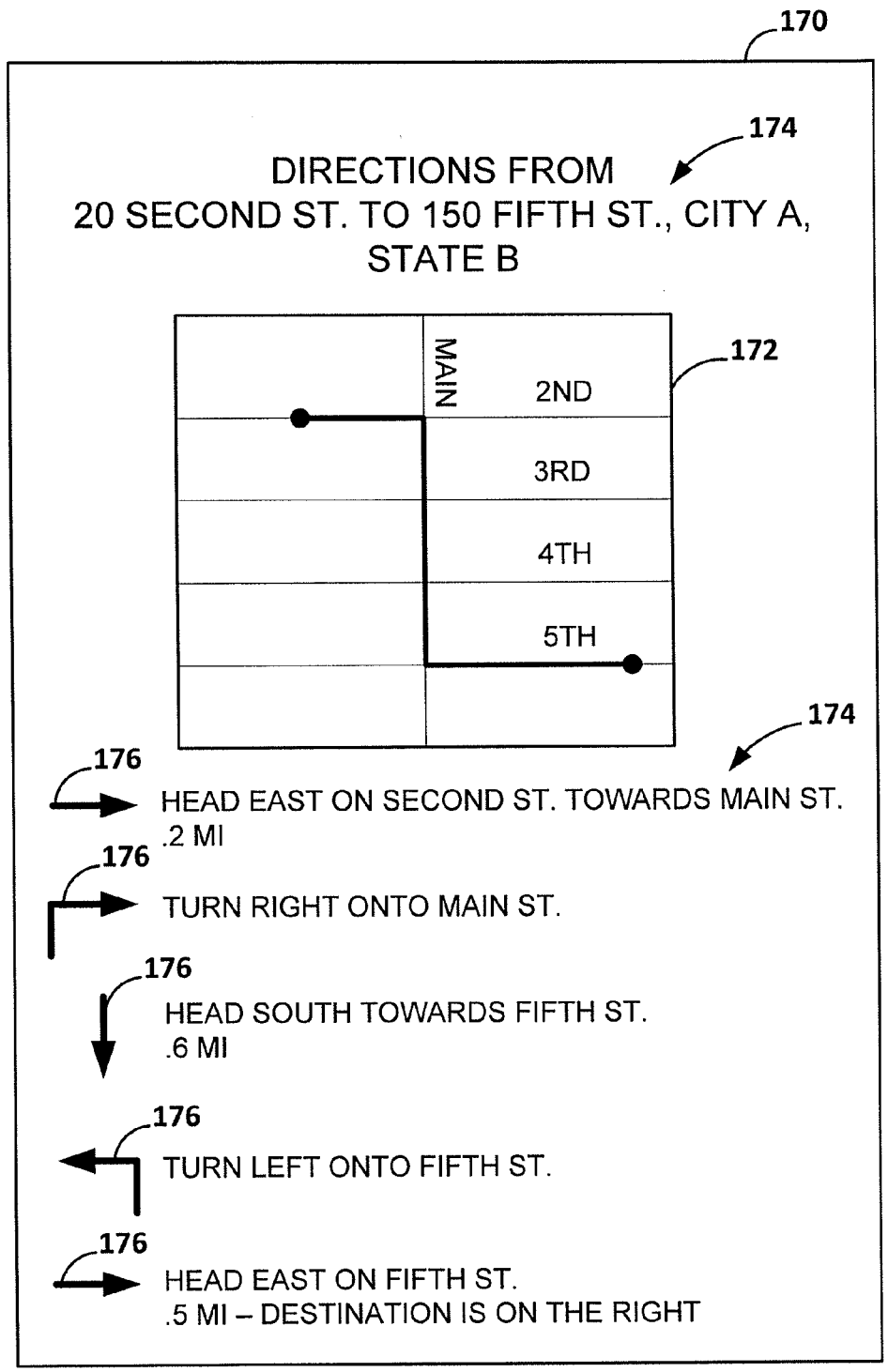
FIG. 13 illustrates an example of an original document that includes image and drawing objects.

FIG. 13 illustrates an example of an original document 170 that includes image, text, and drawing objects. The original document 170 includes an image object 172 in the form of a map, text objects 174 in the form of driving directions, and drawing objects 176 in the form of arrows accompanying the driving directions.

Figure 14:
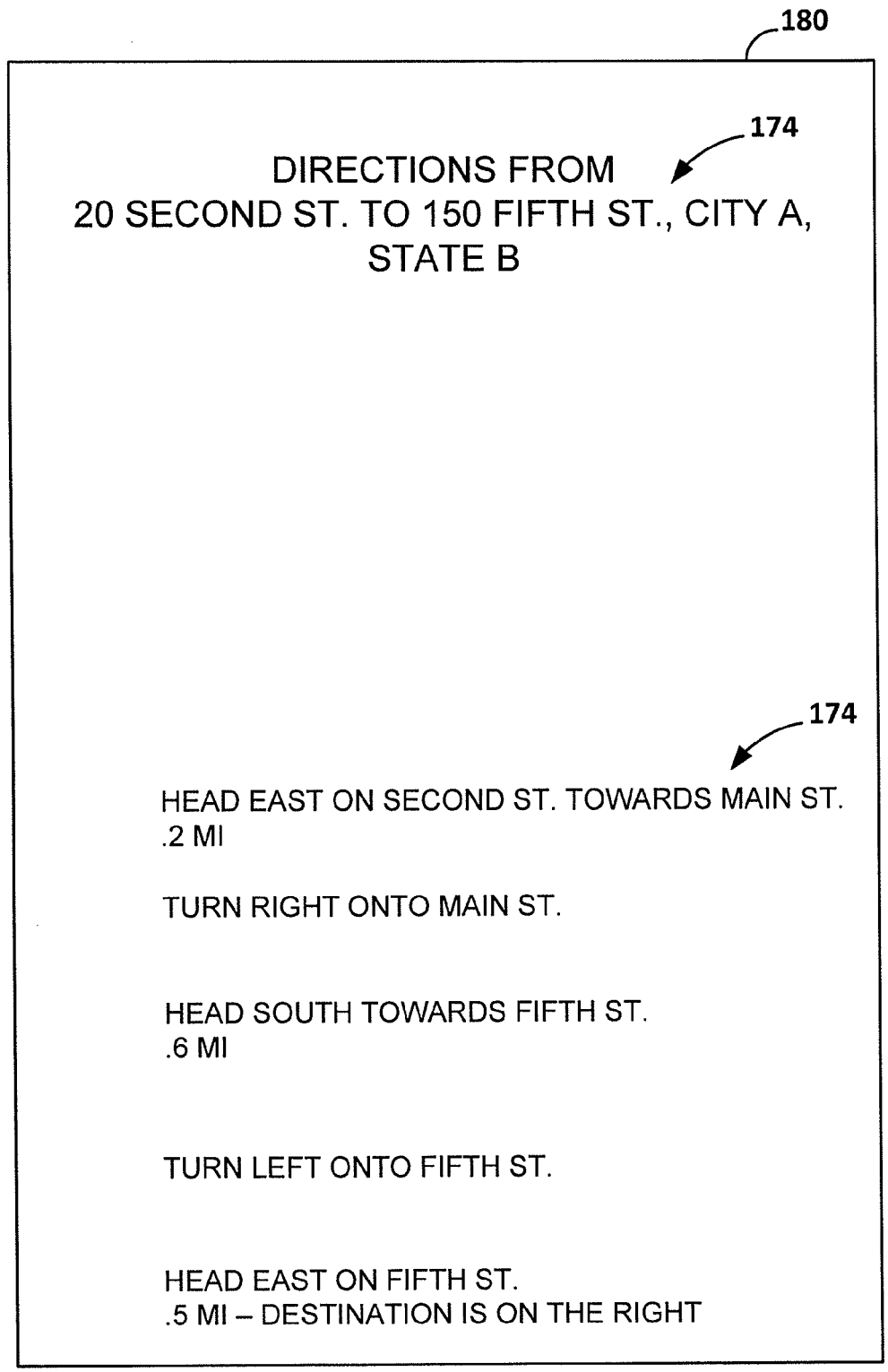
FIG. 14 illustrates an example of a document that has been printed after the image and drawing objects are removed from the original document of FIG. 13 in accordance with a selected object removal option.

FIG. 14 illustrates an example of a document 180 that has been printed after the image and drawing objects 172 and 176 are removed from the original document 170 in accordance with a selected object removal option. Namely, in accordance with the principles described herein, a user can select an option to remove image and drawing objects from the original document 170. Subsequently, objects of an image type and a drawing type selected for removal are removed from the original document 170 prior to printing. Hence, after printing, the document 180 no longer contains the image and drawing objects 172 and 176.

As shown in FIG. 14, after the selected objects are removed (i.e., the image object 172 (the map) and the drawing objects 176 (the arrows)), the printed document 180 contains only the driving directions, or the text objects 174. Advantageously, a user has the flexibility to print only text objects included in an original document if the user is not interested in other types of objects (e.g., objects in the form of pictures, diagrams, etc.). In particular, in the present example, the user may only be interested in printing the driving directions (or text objects), and may wish to discard all remaining image and drawing objects in the original document 170 prior to printing.

Note that, as shown in FIG. 14, text included in an image object (i.e., the image object 172) has been also removed. Hence, an object may not be printed if it is marked for removal even if it appears as a different type of object. However, in such cases, it may be possible to extract the text from the image object prior to object removal. For instance, applications such as Adobe Acrobat®, provide a character/text recognition feature that can extract text characters from image objects.

3. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method, comprising:
receiving, at an image forming apparatus, a print document sent from a computing device remote from the image forming apparatus, wherein the print document includes print data;
receiving, at the image forming apparatus, a directive to remove, from the print document, at least one type of object selected for removal, wherein the print data includes data representing one or more objects of the at least one type of object selected for removal, wherein the at least one type of object selected for removal is selected from a first type of object and a second type of object that differs from the first type of object, wherein the directive includes at least one of a first directive provided via an operation panel at the image forming apparatus and a second directive provided via the computing device, and wherein the second directive comprises an object removal command in the print document;
in response to the directive, removing, by the image forming apparatus, the one or more objects of the at least one type of object selected for removal prior to printing the print document;
rendering, from the print document, only objects not included in the directive to remove; and
printing only the rendered objects from the print document.

2. The method of claim 1, wherein the at least one type of object selected for removal includes at least one of a drawing object, an image object, and a text object.

3. The method of claim 1, wherein the object removal command is a command in Job Printer Language (JPL).

4. The method of claim 1, wherein the object removal command is generated at the computing device.

5. The method of claim 4, wherein the object removal command is generated by a printer driver used by the computing device.

6. The method of claim 1, wherein the directive comprises an environment value set via the operation panel at the image forming apparatus.

7. The method of claim 1, wherein the directive is produced in response to one or more selection inputs indicating the at least one type of object to be removed.

8. The method of claim 7, further comprising:
selecting, via the computing device or the image forming apparatus, the at least one type of object to be removed from the print document.

9. The method of claim 7, wherein each of the one or more inputs includes a selection of a respective type of object to be removed.

10. The method of claim 7, wherein the one or more selection inputs are provided via a user interface at the computing device.

11. The method of claim 7, wherein the one or more selection inputs are provided via a user interface on the operation panel at the image forming apparatus.

12. The method of claim 11, wherein:
the user interface is a graphical user interface (GUI), and
the operation panel includes a display device that displays the GUI.

13. The method of claim 1, wherein the directive includes both the first directive provided via the image forming apparatus and the second directive provided via the computing device, the method further comprising:
receiving, at the image forming apparatus, the first directive;
receiving, at the image forming apparatus, the second directive; and
selecting the first directive rather than the second directive to remove the one or more objects of the type of object selected for removal.

14. A system comprising:
an image forming apparatus; and
a computing device remote from the image forming apparatus, wherein the image forming apparatus is configured to
(i) receive a print document sent from the computing device, wherein the print document includes print data;
(ii) receive a directive to remove, from the print document, at least one type of object selected for removal, wherein the print data includes data representing one or more objects of the type of object selected for removal, wherein the at least one type of object selected for removal includes a first type of object selected for removal and a second type of object selected for removal, the first type of object being different from the second type of object, and wherein the directive includes a first directive provided via the image forming apparatus and a second directive provided via the computing device,
(iii) in response to the directive, remove the one or more objects of the type of object selected for removal prior to printing the print document, and
(iv) render the print document for printing after objects of the type of object selected for removal are removed.

15. The system of claim 14, further comprising prioritizing one of the first directive and the second directive over the respective other of the first directive and the second directive.

16. The system of claim 15, further comprising prioritizing the first directive over the second directive.

17. A system comprising:
at least one processor;
a non-transitory computer-readable medium; and
program instructions that are stored in the non-transitory computer-readable medium and, when executed by the at least one processor, cause the at least one processor to perform functions including:
(i) receiving a print document sent from a computing device remote from the at least one processor, wherein the print document includes print data;
(ii) receiving a directive to remove, from the print document, at least one type of object selected for removal, wherein the print data includes data representing one or more objects of the type of object selected for removal, wherein the at least one type of object selected for removal includes a first type of object selected for removal and a second type of object selected for removal, the first type of object being different from the second type of object, and wherein the directive includes a first directive provided via an image forming apparatus and a second directive provided via the computing device;
(iii) in response to the directive, removing the one or more objects of the type of object selected for removal prior to printing the print document; and
(iv) render the print document for printing after objects of the type of object selected for removal being removed.

18. The system of claim 17, further comprising prioritizing one of the first directive and the second directive over the respective other of the first directive and the second directive.

19. The system of claim 18, further comprising prioritizing the first directive over the second directive.

* * * * *